G. E. HACKETT.
TOOL SHANK.
APPLICATION FILED JAN. 26, 1910.
994,154.
Patented June 6, 1911.
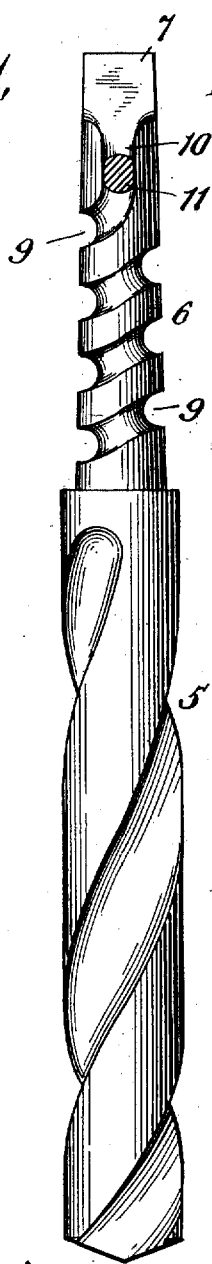
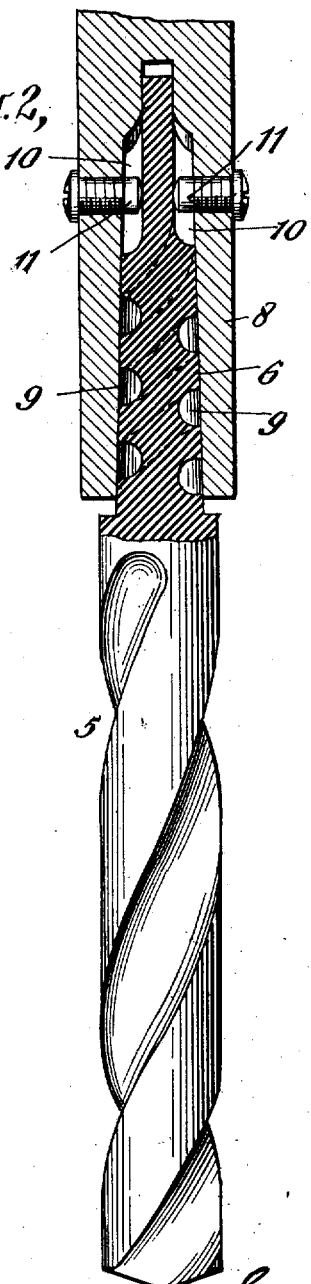

UNITED STATES PATENT OFFICE.

GEORGE E. HACKETT, OF NEW YORK, N. Y.

TOOL-SHANK.

994,154.  Specification of Letters Patent.  Patented June 6, 1911.

Application filed January 26, 1910.  Serial No. 540,122.

*To all whom it may concern:*

Be it known that I, GEORGE E. HACKETT, a citizen of the United States of America, and a resident of New York, county and State of New York, have invented certain new and useful Improvements in Tool-Shanks, of which the following is a specification, reference being had to the accompanying drawings, forming a part thereof.

My invention relates to improvements in tools of the nature of twist drills, cutters, and the like, which are provided with shanks, usually of tapered form, for insertion in a socket, and my invention consists in providing such a tool shank, throughout a portion of its length, with one or more peripheral helical grooves, whereby under endwise pressure or torsional strain the shank will be permitted to slightly expand, and hence to more intimately engage the walls of the socket. The said groove or grooves terminate at such a point along the shank, short of the tool end thereof, that an ungrooved portion of the shank will enter the socket. This provides against any weakened portion of the shank from existing outside the socket thus obviating any tendency of the shank to twist off below the socket such as might otherwise readily occur.

In a previous patent granted to me July 14, 1908, I have shown and described a drill in which the shank is formed of a twisted strip or ribbon of steel, but I find that for some purposes a solid shank, as distinguished from such a twisted skeleton shank, is preferable. Again, by my present invention I am enabled to take standard drills or other tools and by milling or otherwise forming one or more grooves around the periphery of the shank, obtain the desired expansibility under endwise or torsional strain.

In carrying out my invention I provide that the groove or grooves terminate at a short distance from the tool end of the shank so that at such end the shank has a solid and unyielding portion whereby only such part of the shank which is contained in the chuck or tool holder shall be weakened by the groove or grooves. In this way the chuck or tool holder itself acts to limit the expansion of the tool shank and the danger of the tool twisting off through any such weakness at a point beyond the chuck or tool holder, is eliminated.

In order that my invention may be fully understood, I will now proceed to describe an embodiment thereof, having reference to the accompanying drawings illustrating the same, and will then point out the novel features in claims.

In the drawings: Figure 1 is a view in side elevation of a drill having a shank constructed in accordance with my invention. Fig. 2 is a view in longitudinal section therethrough and through a socket constructed to receive the same.

The tool comprises in the main a body portion 5 and a solid shank 6 of circular contour. The said shank is preferably of conical form, and is provided at its extremity with a flattened portion 7 constituting a tang. The shank is intended to fit into a corresponding recess in a socket 8, the inner portion thereof being narrowed to receive the tang, whereby the tool is held against rotation in the socket. The shank is provided throughout a portion of its length with one or more peripheral helical grooves 9, the same being conveniently of a depth equal to about one-third of the diameter of the shank whereby a solid core is the result as will be well understood by reference to the drawings. The said groove terminates at a short distance from the tool end of the shank so that at such end the shank has a solid and unyielding portion. The portion of the shank which will expand under torsional or longitudinal strain is of course that part only which contains the helical groove, the solid portion between the end of the helical groove and the body portion of the tool, and the portion between the end of the helical groove and the tang, being rigid. The existence of the terminal portions 10 of the grooves at the tang end of the shank will not of course permit any twist at such point, as will be well understood.

The terminal portion 10 of the helical groove or grooves, toward the tang end of the shank, is preferably deflected to a direction parallel with the axis of the shank, as is clearly shown in Fig. 1 of the drawings, the bottom of the groove preferably registering with the face of the tang. These terminal portions of the grooves, when so disposed, are adapted to receive keys or abutments 11 projecting inward from the sides of the socket, as is shown in Fig. 2, whereby to reinforce the action of the tang in holding the tool against rotation. This strengthens the shank at the tang end, and prevents the tangs from being twisted off as is quite common in large sized drills. The shank is intended to have a sliding fit with the socket, but in operation when longitudinal or torsional strain is applied thereto, the presence of the helical groove or grooves will cause the shank to slightly expand so as to more intimately engage the walls of the socket, and the amount of this tendency to expand will be directly proportional to the lengthwise or torsional strain imparted. The result of this will be that as the severity of the work exposed upon the drill is increased the frictional engagement between the shank and socket will be correspondingly increased.

What I claim is:

1. A tool shank having an intermediate expansible portion and upper and lower extremities which are non-expansible, the expansible portion containing a helical groove which terminates at the non-expansible portions.

2. A tool shank having an intermediate expansible portion and upper and lower extremities which are non-expansible, the expansible portion containing a plurality of helical grooves which terminate at the non-expansible portion.

3. A tool shank having a tang at one end, a solid non-expansible portion at the other end, and an expansible portion between the said non-expansible portion and the end containing the tang.

4. A tool shank having a tang at one end and a solid non-expansible portion at the other end, the intermediate portion containing a helical groove.

5. A tool shank having a tang at one end and a solid non-expansible portion at the other end, the intermediate portion containing a plurality of helical grooves.

GEORGE E. HACKETT.

Witnesses:
D. Howard Haywood,
Lyman S. Andrews, Jr.

Copies of this patent may be obtained for five cents each, by addressing the "Commissioner of Patents, Washington, D. C."